United States Patent [19]

Collée et al.

[11] Patent Number: 4,756,393
[45] Date of Patent: Jul. 12, 1988

[54] APPARATUS FOR VARYING THE DAMPING CHARACTERISTICS OF A SHOCK ABSORBER

[75] Inventors: Ronald Collée, Rotterdam, Netherlands; Johannes De Baan, Ennepetal; Marwin Kinzl, Lüdenscheid, both of Fed. Rep. of Germany

[73] Assignees: Iku Holding Montfoort B.V., Montfoort, Netherlands; August Bilstein GmbH & Co. KG, Ennepetal; Leopold Kostal GmbH & Co. KG, Lüdenscheid, both of Fed. Rep. of Germany

[21] Appl. No.: 897,372

[22] Filed: Aug. 18, 1986

[30] Foreign Application Priority Data

Aug. 16, 1985 [NL] Netherlands ............... 8502266

[51] Int. Cl.$^4$ ............................................. F16F 9/46
[52] U.S. Cl. ........................... 188/299; 74/801; 188/319; 280/707; 464/102; 464/106
[58] Field of Search ............. 188/299, 319, 285; 74/801; 464/102, 106, 125; 280/707, 714

[56] References Cited

U.S. PATENT DOCUMENTS

| | | | |
|---|---|---|---|
| 1,149,106 | 8/1915 | Whitney | 74/801 |
| 1,197,802 | 9/1916 | Laney | 464/125 X |
| 1,799,740 | 4/1931 | Felton | 74/801 |
| 1,923,649 | 8/1933 | Warner | 464/125 X |
| 3,559,776 | 2/1971 | Schultze | 188/299 |
| 4,286,442 | 9/1981 | Peterson | 464/102 X |
| 4,313,529 | 2/1982 | Kato et al. | 188/299 |
| 4,398,704 | 8/1983 | Buchanan, Jr. et al. | 280/707 X |
| 4,529,392 | 7/1985 | Lindenthal et al. | 464/134 X |
| 4,591,186 | 5/1986 | Ashiba | 280/714 X |
| 4,635,960 | 1/1987 | Shirakuma | 280/707 |
| 4,643,699 | 2/1987 | Taig | 464/125 X |
| 4,645,042 | 2/1987 | Inoue et al. | 188/319 |

FOREIGN PATENT DOCUMENTS 229902 10/1963 Austria ............... 464/102

*Primary Examiner*—George E. A. Halvosa
*Attorney, Agent, or Firm*—Wenderoth, Lind & Ponack

[57] ABSTRACT

An apparatus for varying the damping characteristics of a shock absorber of the kind comprising a piston rod and an adjusting shaft mounted coaxially within the piston rod for rotation relative to the piston rod. Upon a change in its angular position relative to the piston rod, the adjusting shaft effects a change in an effective oil passage area in the shock absorber, and thus varies its damping characteristics. The adjusting shaft (16) has a free end (15) located at the end of the piston rod. The apparatus comprises a housing (4, 18, 19, 50) arranged to be attached to the end of the piston rod. The housing accommodates, in succession: an electric motor (1) adapted to be driven and positioned in two directions; a speed reducer (2) coupled to an output shaft (26) thereof; and a universal joint (3) disposed between an output member (33) of the speed reducer (2) and the free end (15) of the shock absorber adjusting shaft (16).

14 Claims, 2 Drawing Sheets

APPARATUS FOR VARYING THE DAMPING CHARACTERISTICS OF A SHOCK ABSORBER

BACKGROUND OF THE INVENTION

1. Field of the Invention

This invention relates to an apparatus for varying the damping characteristics of a shock absorber, said shock absorber comprising a piston rod and an adjusting shaft mounted coaxially within the piston rod for rotation relative to said rod and, upon a change in its angular position relative to the piston rod thereby effecting a change in an effective oil passage area in the shock absorber, the adjusting shaft having a free end located at the end of the piston rod.

2. Description of the Prior Art

Shock absorbers of this type are conventional. A change in their damping characteristics is brought about in a garage by means of hand tools, with which the rotatable adjusting shaft can be turned. In principle, this adaptation of the damping characteristics is effected once and intended to adapt the damping behavior of the shock absorber to the spring characteristics of the vehicle on which the shock absorber is mounted. A "hard" shock absorber adjustment generally improves the road stability of the vehicle at high velocities, while a "soft" shock absorption is used to enhance travelling comfort.

SUMMARY OF THE INVENTION

It is an object of the present invention to provide an apparatus or adjusting instrument, by means of which the damping characteristics of the shock absorber can be continuously adapted to the road behavior of the vehicle. For example, at low velocities, it will be possible for the damping characteristics of the shock absorber to be so adjusted that travelling comfort, while yet still justified, is as great as possible, while at high velocities there is automatic adaptation in the direction of a greater stiffness of the shock absorber to improve road stability. The adjusting instrument must permit being accommodated in a very small area, and therefore be of extremely compact construction.

For this purpose, the apparatus according to the present invention is characterized by comprising a housing arranged to be attached to the end of the piston rod, said housing accommodating, in succession,

- an electric motor adapted to be driven and positioned in two directions;
- a speed reducer coupled to an output shaft thereof; and
- a universal type joint disposed between an output member of the speed reducer and the free end of the shock absorber adjusting shaft.

The compact construction is obtained by placing main parts of very small height, such as the speed reducer and a universal joint, one after the other. On the basis of its small rotary clearance and low structural height, a preferred speed reducer is a planetary transmission capable of effecting a sufficient reduction to produce the desired, proportional increase of the adjusting torque. The universal joint between the speed reducer and the free end of the adjusting shaft provides a possibility of compensation in cases in which the axis of the instrument is out of alignment with the axis of the adjusting shaft.

In order to obtain a remote position indication, the electric motor is preferably coupled to a rotation position detector of the inductive type. Preferably, a Hall sensor is used for this purpose.

The combination of the electric motor and the position detector may be replaced by a stepping motor capable of rotating the adjusting shaft in a number of discrete steps. An angular displacement of the adjusting shaft through 160° is sufficient to give the shock absorber a sufficiently large series of different damping characteristics.

As the adjusting instrument is accommodated in corrosive surroundings in the engine compartment of a vehicle, it is necessary that the instrument be of dust-proof and waterproof construction. For this purpose the housing is made of sections that snap together to vertically confine the various parts of the adjusting instruments.

The electric motor of the adjusting instrument is controllable through signal and supply lines connected through an electronic control unit to tranducers arranged within a vehicle to determine the vehicle speed, the vehicle load, the inclination of the vehicle related to its cross and longitudinal axis respectively and the viscosity of the oil within the shock absorber.

BRIEF DESCRIPTION OF THE DRAWINGS

One embodiment of the adjusting instrument according to the invention will now be described, by way of example, with reference to the accompanying drawings, in which.

DESCRIPTION OF THE PREFERRED EMBODIMENTS

Figure 1:
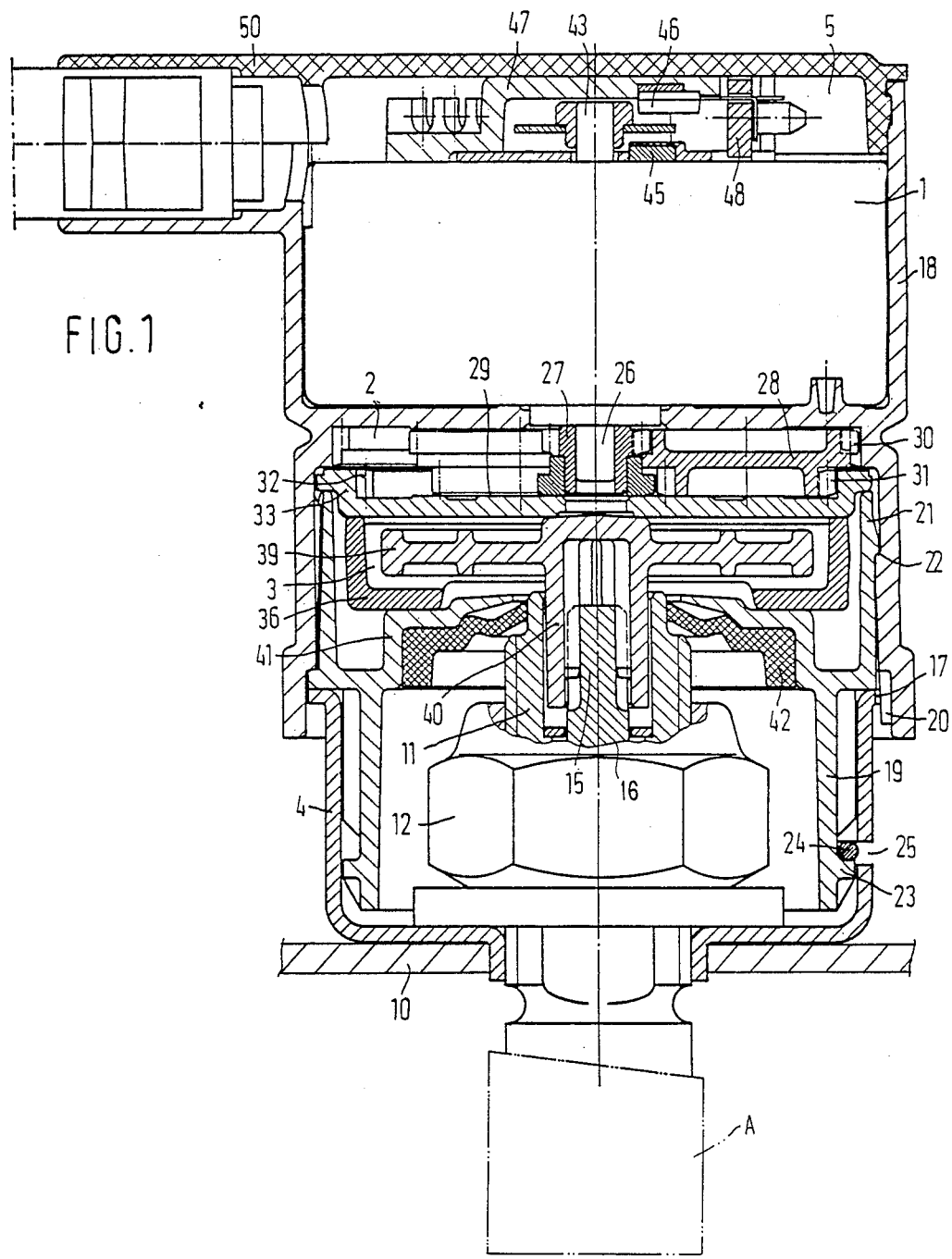
FIG. 1 shows a vertical cross-sectional view of the adjusting instrument.

The piston rod 11 of a shock absorber is secured to a seat 10 by means of a nut 12, which seat is to be supported on a vehicle chassis through the medium of rubber blocks. Extending within piston rod 11 and coaxially therewith is an adjusting shaft 16 having a lower end adapted to effect a change in an effective oil passage area by any conventional means (shown in dotted lines in FIG. 1 as A), the upper end 15 of the adjusting shaft 16 being located within piston rod 11, but extending axially beyond nut 12 to be accessible from the outside. The end 15 of adjusting shaft 16 is formed, for example, as a spline shaft. An open-ended, cylindrical cap 4 is placed around nut 12 and is pressed firmly into contact with seat 10 by means of nut 12. Cap 4 is provided at the top with an outward, toothed flange 17 arranged to mesh with an internally toothed edge 20 of the housing top section 18. The meshing toothed edges 17, 20 provide for the connection in circumferential direction of housing top section 18 relative to cap 4. The axial confinement of housing top section 18 in cap 4 takes place through the medium of a housing bottom section 19. This is provided at the top with at least three detent fingers 21, regularly spaced about its circumference and arranged to catch behind a detent edge 22 provided in the housing top section 18. At the bottom, the housing bottom section 19 is provided with a detent edge 23, which can be axially confined behind a detent spring 24, housed in a horizontal slot 25 in cap 4.

Figure 3:
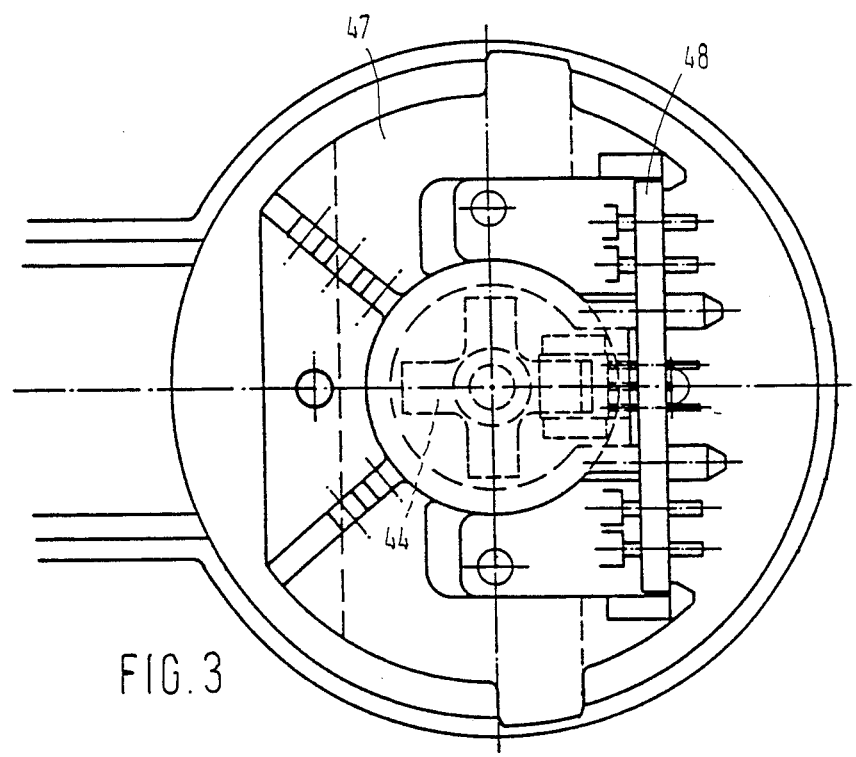
FIG. 3 shows a top plan view of the adjusting instrument with the top cover being removed.

Coaxially confined in the housing top section 18 is a D.C. motor 1 adapted to be driven and positioned in two directions. At the top, the rotor of motor 1 is provided with an impeller 44 (as shown in FIG. 3), which rotates in the permanent magnetic field of a rotation detector 5, to be described in more detail hereinafter, to provide a position indication of the angular position of the rotor of the electric motor 1. The output shaft 26 of motor 1 is connected to the input shaft of a speed reducer 2. Speed reducer 2 is comprised by a planetary transmission system which is free from clearance and capable of supplying a high speed reduction and a proportionate increase of the torque generated by motor 1. Mounted on motor shaft 26 is a sun gear 27, which meshes with three planet gears 28. Sun gear 27 is axially confined by a ring 29. Planet gears 28 are provided with upper and lower rows of teeth 30, 31, the upper teeth 30 being engaged with sun gear 27 and with a toothed inner ring of housing 18. The lower teeth 31 of each planet gear 28 mesh with an internally toothed ring 32 of an output disk 33, mounted for rotation within housing 18. The output disk 33 is axially confined in housing 18 by means of the upper edge of the housing bottom section 19. The reduction between motor shaft 26 and output disk 33 is, for example 1 to 45 or more.

Figure 2:
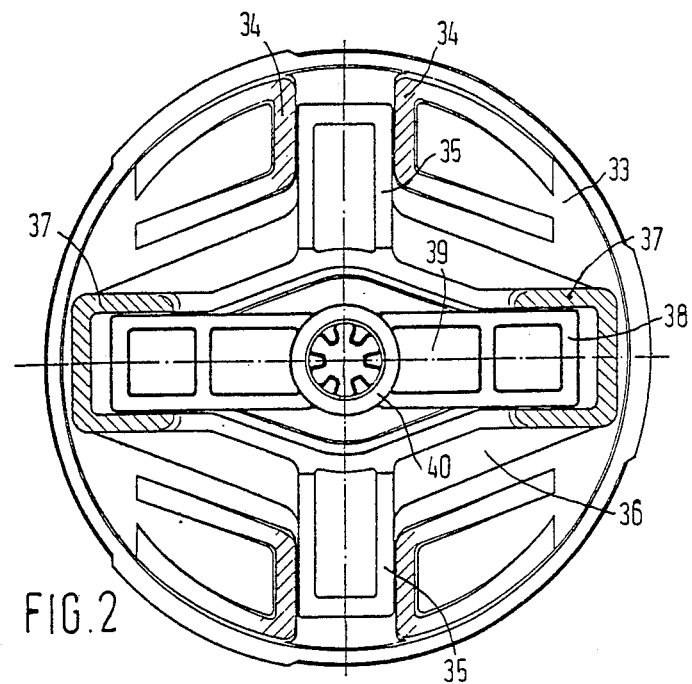
FIG. 2 shows a diagrammatic bottom view of the universal joint, used in the instrument shown in FIG. 1.

In order to permit a certain eccentricity and also an oblique position of the axis of the adjusting mechanism relative to the axis of the shock absorber, the output disk 33 is coupled by means of a universal joint 3 to the end 15 of the shock absorber adjusting shaft 16. This universal joint 3 is shown diagrammatically in a bottom view shown in FIG. 2.

Secured to the bottom of output disk 33 are four spaced-apart, axially extending catches 34, placed in juxtaposition to each other in pairs. Between each pair of catches 34, an arm 35 of a cross piece 36 can be received for transverse sliding movement. Extending at right angles to the arms 35, 35 of the cross piece 36 are arms 37, 37 of cross piece 36, each consisting of juxtaposed, spaced-apart axially extending parallel wings. Between each pair of wings of an arm 37, an arm 38 of a connector 39 can be received for sliding movement transverse to the axis. The diametrically opposed arms 38 of connector 39 are connected to a central hollow cylindrical member 40, which is provided with keyways on the inside thereof, by virtue of which the member 40 can be pushed onto the end 15 of the shock absorber adjusting shaft 16, which end 15 is provided with corresponding keyways.

When the motor 1 is rotating, the end 15 of adjusting shaft 16 is circumferentially adjusted, with a reduction, through the medium of the speed reducer 2 and the universal joint 3, which results in an increase or decrease of the oil passage in the shock absorber, depending on the direction of rotation of shaft 16.

The cross piece 36 of the universal joint 3 is axially confined by a partition 41 of the housing bottom section 19. This partition 41 is provided with a central orifice to permit the passage therethrough of the cylindrical part 40 of connector 39. Confined within a cavity formed by the partition 41 is a gasket 42, which is in contact with an edge of piston rod 11 projecting beyond nut 12, and surrounding the end 15 of the shock absorber adjusting shaft 16. In this way all of the parts of the adjusting instrument accommodated in housing 18, 19 are protected from moisture and dust.

The rotation detector (see FIGS. 1 and 3) comprises a four-bladed impeller 44 mounted on a free end 43 of the motor shaft 26. The blades of impeller 44 can move between a permanent magnet 45 and a juxtaposed Hall sensor 46 capable of detecting a change in the magnetic field by impeller 44 and converting it into a signal which is a measure for the number of revolutions of motor 1. The permanent magnet 45 is attached to motor 1, for example, by means of an adhesive. Hall sensor 46 is housed in a cap 47, also attached to motor 1. Housed further in cap 47 is a printed-circuit panel 48 comprising three terminals for the Hall sensor 46 and further terminals for the supply lines of motor 1. Rotation detector 5 is confined within the housing top section 18 by means of a snap cover 50.

Extending from the housing top section 18 are a series of signal and supply lines to the control electronics of the system. Through the medium of these signal lines, the position of adjusting shaft 16 is indicated to the control electronics by means of position detector 5, and adjusting signals from the control electronics are supplied to motor 1.

When the vehicle is started, care is taken that a signal is given to motor 1 through the signal and supply lines so that adjusting shaft 16 comes to be in a zero or starting position, in which the oil passage in the shock absorber is largest or smallest, so that the shock absorber has the softest or hardest damping characteristics. Depending on a number of parameters, such as road condition, travelling speed, load, etc., which parameters are converted by various detectors in the vehicle into control signals which are passed to the control electronics, the damping characteristics of the shock absorber can be automatically varied and optimally adjusted in response to measured values of the various parameters.

While the present invention has been described with reference to the foregoing embodiment, it should be understood that many changes and modifications may be made thereto which are within the scope of the claimed invention.

What we claim:

1. An apparatus for varying the damping characteristics of a shock absorber, said shock absorber comprising a piston rod and an adjusting shaft mounted coaxially within the piston rod for rotation relative to said rod and, upon a change in its angular position relative to the piston rod, effecting a change in an effective oil passage area in the shock absorber, the adjusting shaft having a free end located at a corresponding end of the piston rod which is arranged to be attached to a housing accommodating in succession an electric motor, a speed reducer coupled to an output shaft of the electric motor and a universal joint disposed between an output member of the speed reducer and the free end of the adjusting shaft, the housing including a housing top section accommodating the electric motor and connected to a housing bottom section containing the universal joint, the universal joint being supported on a partition of the housing bottom section, said universal joint comprising a four-armed cross piece including a first pair of arms connected to the output member of the speed reducer for rotation therewith and for transverse sliding movement between catches of the output member of the speed reducer, the cross piece including a second pair of arms connected to a connector for rotation therewith and for transverse sliding movement relative to the connector, the connector being adapted for connection to the free end of the adjusting shaft for rotation therewith, the pivot axes of the universal joint extending through the first and second pairs of arms.

2. The apparatus as claimed in claim 1, wherein said electric motor is connected to a rotation position transducer of the inductive type.

3. The apparatus as claimed in claim 1, wherein said electric motor is an incremental motor.

4. The apparatus as claimed in claim 1, wherein the housing bottom section is provided at its bottom with a detent edge adapted to engage a detent spring provided in a cap securable to the piston rod, the arrangement being such that an axial coupling is formed between the housing top section and the cap, the cap having a toothed outward flange adapted to mesh with a correspondingly toothed internal edge of the housing top section for circumferentially coupling said cap and said housing top section.

5. The apparatus as claimed in claim 1, wherein the speed reducer is a planet gear mechanism comprising a sun gear in operative association with three planet gears having double rings of teeth, one ring of teeth being arranged to roll over a stationary toothed inner ring of the housing top section, and the other ring of teeth being arranged to drive an internally toothed ring provided on the output member.

6. The apparatus as claimed in claim 1, wherein the connector is connected to the free end of the adjusting shaft by means of a spline-shaft joint.

7. The apparatus as claimed in claim 1, wherein the electric motor is arranged to be controlled via signal and supply lines which via an electronic control unit are connected to detectors arranged within a vehicle to determine the vehicle speed, the vehicle load, the inclination of the vehicle related to its cross and longitudinal axis respectively and the viscosity of the oil within the shock absorber.

8. An apparatus for rotating an adjusting shaft of a shock absorber wherein the adjusting shaft is mounted coaxially with a piston rod of the shock absorber and is effective for changing an effective oil passage area between a pair of chambers separated by a piston carried on the piston rod, the apparatus comprising:
a connector mountable on a free end of the adjusting shaft for rotation therewith;
a universal joint engaging said connector for rotation therewith, said universal joint including a cross piece having two pairs of arms, one pair of said arms being movable transversely with respect to and in driving engagement with said connector;
an output member engaging said universal joint for rotation therewith, said output member being movable transversely with respect to and in driving engagement with the other pair of said arms of said universal joint;
a reversible motor having an output shaft; and
gear reducer means coupled between said output shaft and said output member for reducing the speed of rotation of said output member relative to said output shaft of said motor.

9. The apparatus of claim 8, further comprising sensor means for measuring the number of revolutions of said output shaft of said motor.

10. The apparatus of claim 9, wherein said sensor means includes a four-bladed impeller mounted for rotation with said output shaft, a magnet juxtaposed to said four-bladed impeller and a sensor capable of detecting a change in the magnetic field produced by the impeller when passing said magnet.

11. The apparatus of claim 8, wherein said gear reducer means includes a plurality of planet gears, each having two annular rows of gear teeth, one of said rows of gear teeth engaging gear teeth on said output shaft of said motor, said gear reducer means further including an annular ring of gear teeth disposed on an inner wall of a housing section and an annular ring of gear teeth on said output member engaging the other one of said rows of teeth on each of said planet gears.

12. The apparatus of claim 8, wherein said connector includes a pair of radially extending arms extending outwardly from a central member mountable on the free end of the adjusting shaft for rotation therewith, said other pair of said arms of said cross piece of said universal joint each comprising a pair of spaced-apart axially extending wings, each one of said one pair of arms of said connector being disposed between a respective pair of said wings whereby said cross piece is movable transversely with respect to and in driving engagement with said connector.

13. The apparatus of claim 12, wherein said output member includes two pairs of spaced-apart axially extending catches, each one of said other pair of arms of said cross piece of said universal joint being disposed between a respective pair of said catches whereby said cross piece is movable transversely with respect to and in driving engagement with said output member.

14. The apparatus of claim 8, further comprising a cap mountable around a free end of the shock absorber, said cap having a cavity therein facing said connector, a bottom housing section having a lower end thereof received within said cavity in said cap and an upper end supporting said output member thereon, and a top housing section connected to said bottom housing section with said connector, universal joint, said output member, and said motor fitted therebetween.

* * * * *